April 19, 1966     A. K. LITTWIN     3,246,569
MOVEMENT CONTROL APPARATUS
Original Filed March 16, 1960     4 Sheets-Sheet 1
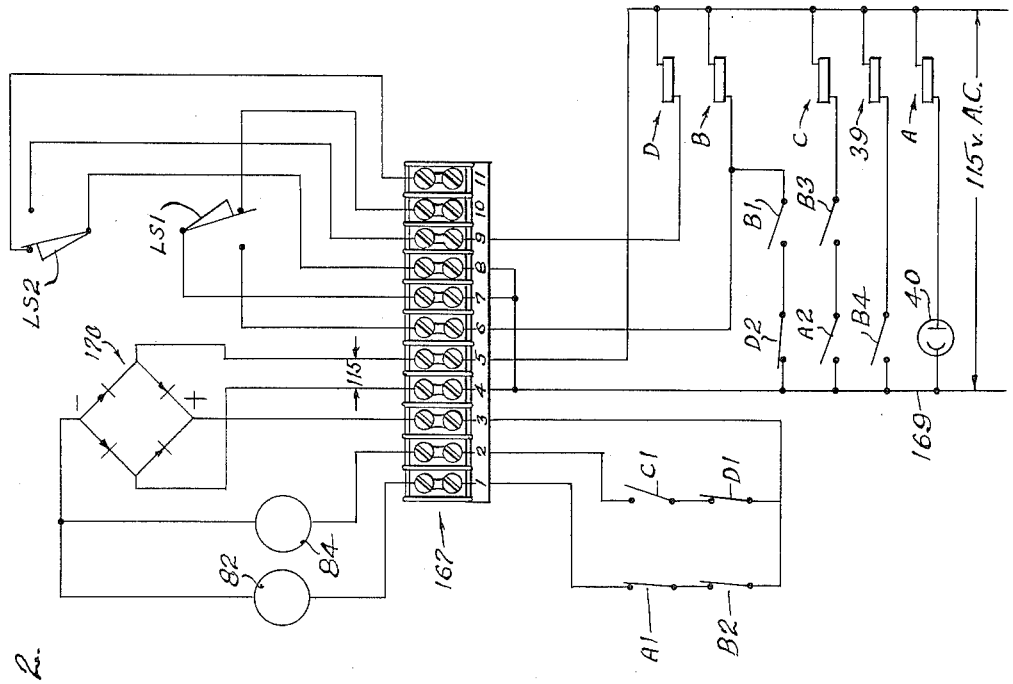
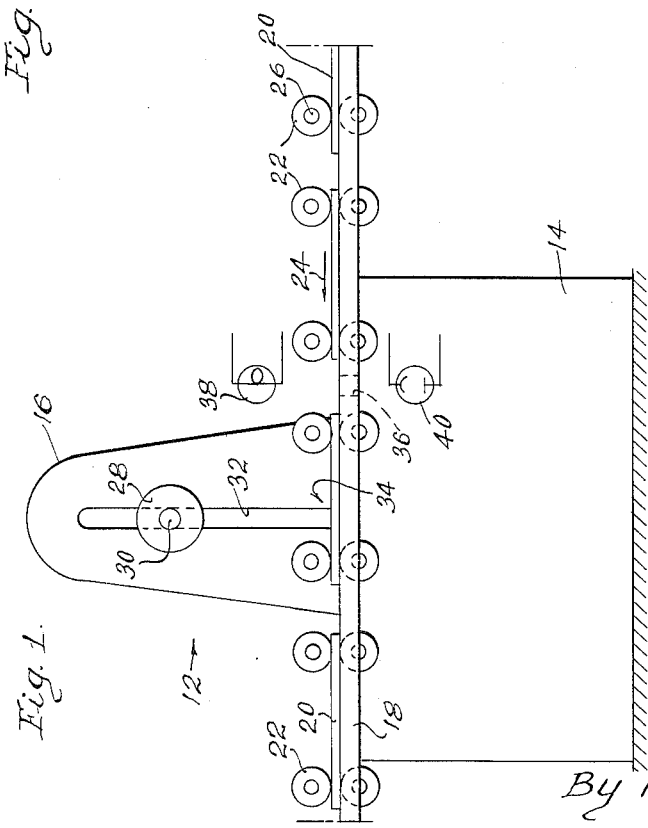
Inventor:
Arthur K. Littwin
By Horton, Davis, Brewer
& Bruggman Attys Inventor:
Arthur K Littwin
By Horton, Davis, Brewer
+ Bingman Attys April 19, 1966   A. K. LITTWIN   3,246,569
MOVEMENT CONTROL APPARATUS
Original Filed March 16, 1960   4 Sheets-Sheet 3
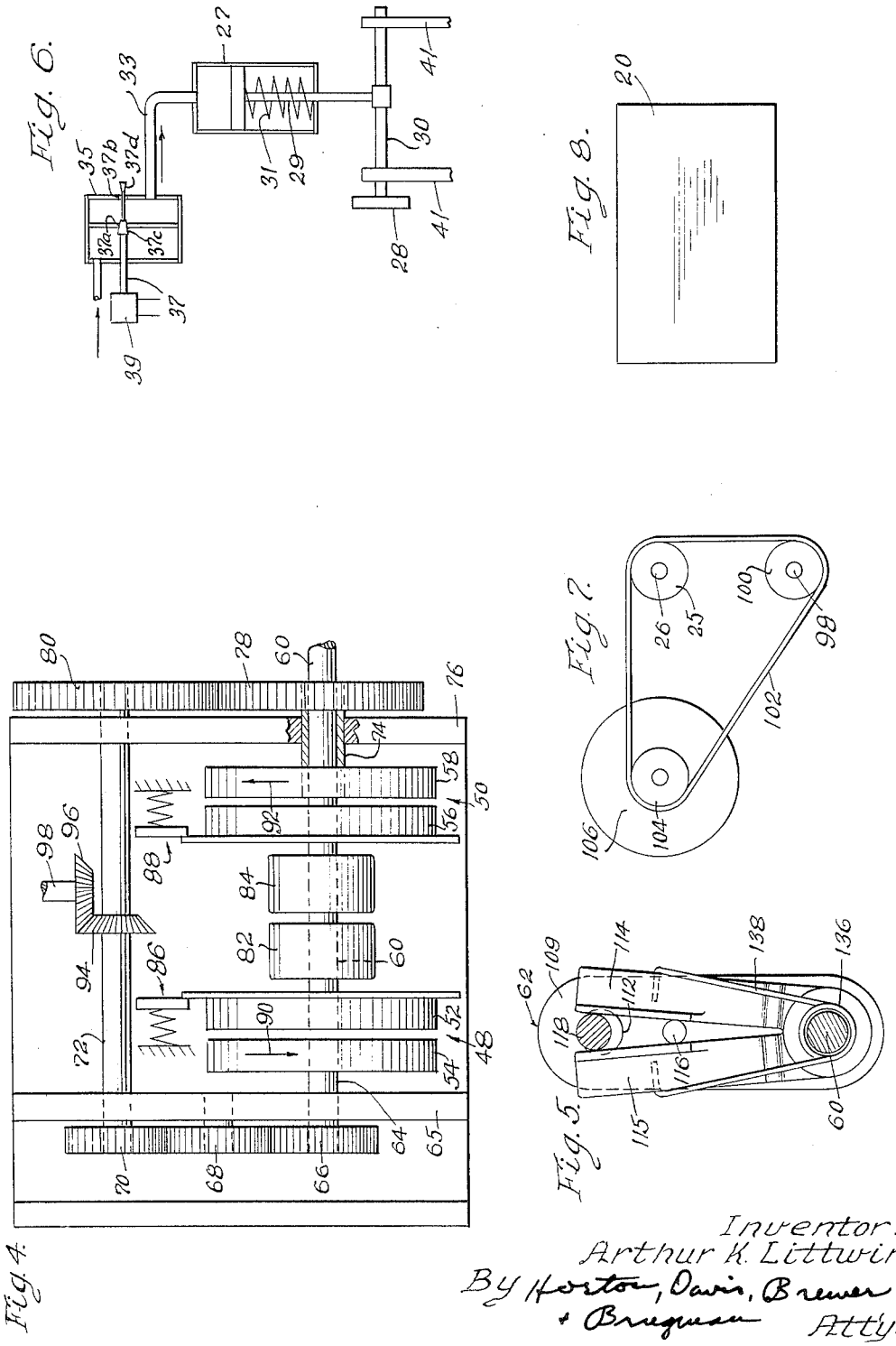

April 19, 1966 A. K. LITTWIN 3,246,569
MOVEMENT CONTROL APPARATUS
Original Filed March 16, 1960 4 Sheets-Sheet 4
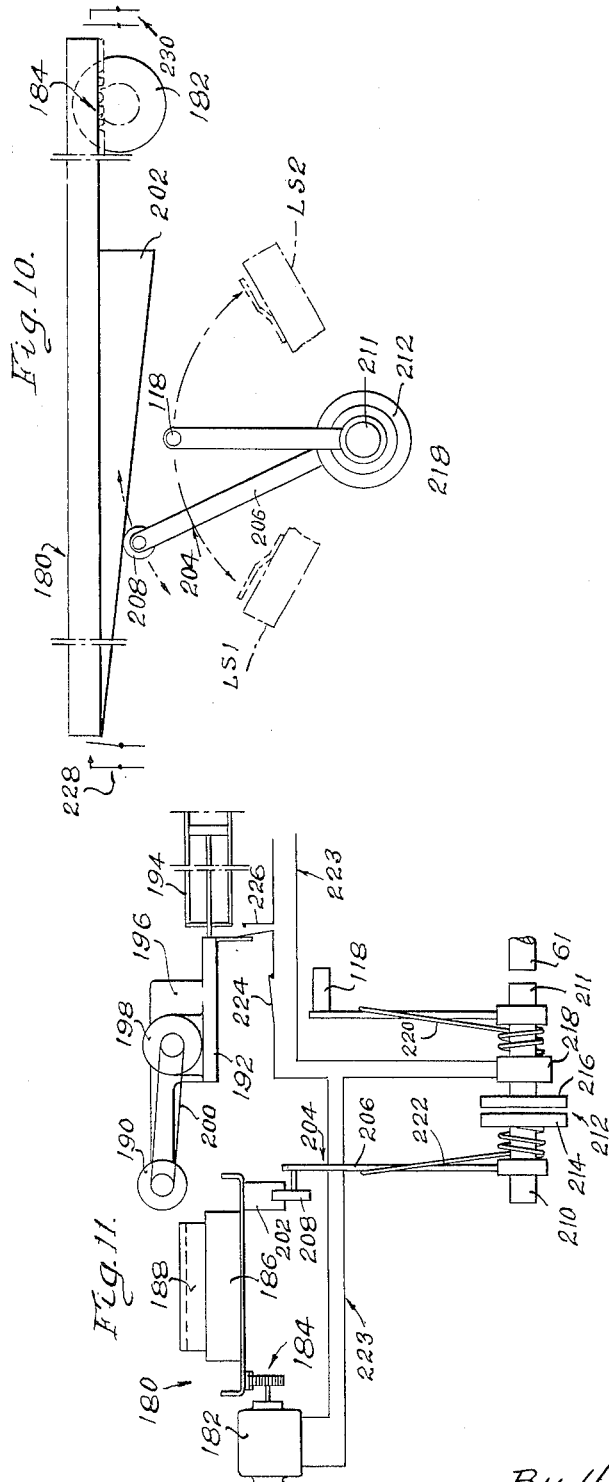
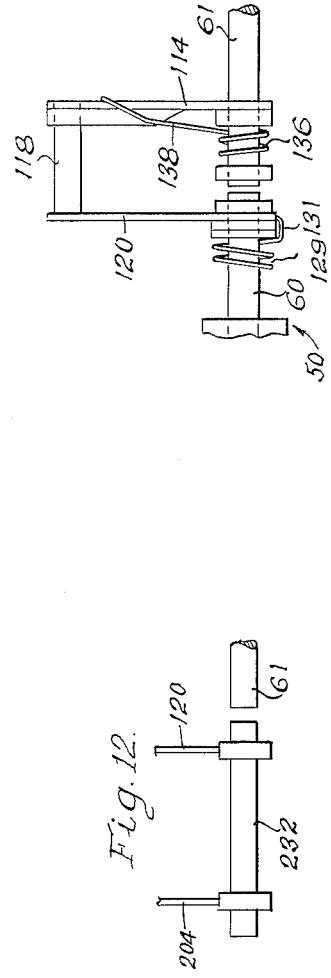
Inventor:
Arthur K. Littwin
By Horton, Davis, Brewer
+ Brugman Attys.

United States Patent Office 3,246,569
Patented Apr. 19, 1966

3,246,569
MOVEMENT CONTROL APPARATUS
Arthur K. Littwin, Lincolnwood, Ill., assignor, by mesne assignments, to Robert L. Littwin, Horace A. Young, Arthur K. Littwin, and Donald F. Littwin, trustees of Littwin family trust
Original application Mar. 16, 1960, Ser. No. 15,282, now Patent No. 3,136,216, dated June 9, 1964. Divided and this application Oct. 16, 1963, Ser. No. 316,575
13 Claims. (Cl. 90—11)

This application is a division of my co-pending application Serial No. 15,282, filed March 16, 1960, now Patent No. 3,136,216, issued June 9, 1964.

The present invention relates to apparatus for controlling the movement of a moving part, such as in an operation performed by a machine tool on a work piece.

The invention has particular utility in controlling such movement in operations in which, for example, work pieces are conveyed along a predetermined path in association with a machine in which an operating tool is arranged for performing an operation on the work pieces as they are conveyed along said path, all in automatic sequence. In many such operations great precision is required. For example, in a machine tool, an operating tool is moved into and out of operative position with respect to a work piece moving along the path. If the operating tool is moved into that operative position at other than a precise moment, imperfect operations or serious damage will result. Heretofore, it has been difficult to control the timing of the operations of the operating tool to the degree of accuracy desired. One of the difficulties previously encountered had to do with the rate of travel of the means conveying the work pieces along the path, and this difficulty was closely related to the fact that a certain and significant period of time is necessary for the operating tool to be moved into and out of its operative position. As a consequence, it was necessary to provide a sensing means that was responsive to the work pieces at a point along the path anterior to the working station at which the operating tool assumed its operative position, the sensing means initiating actuation of the control means provided for effecting movement of the operating tool into its operative position according to the rate of movement of the work pieces.

If the rate of travel of the work pieces, i.e., the conveying means carrying the work pieces, should vary, as is often the case, there would be a variation in the time interval in which the work piece moved from the point at which the sensing means sensed it and the working station at which the operating tool moved into its operative position, and this variation could not be compensated for in those kinds of control apparatus containing independent timing control.

The movement of the conveying means is essentially a mechanical operation requiring significant time intervals for increments of movement, as compared with, for example, the electric in which transmission of electrical pulses is instantaneous from a practical standpoint. Therefore, if the time intervals involved, as referred to, are not incorporated in the timing control of the operating tool, perfect coordination of the movement of the work pieces and operating tool cannot be achieved.

A broad object of the present invention, therefore, is to provide control apparatus of such novel character as to obviate all of the difficulties and disadvantages of the kinds noted above connected with prior devices.

A more specific object is to provide electro-mechanical control apparatus performing a control function of mechanical nature and including a mechanical element having a linear component of movement and directly controlled by the movement of a moving mechanical part of the machine with which it is associated.

A still more specific object is to provide control apparatus of the general character noted above in which control functions are effected under the direct control of electric instrumentalities such as switches, relays, etc., but in which those electric instrumentalities are themselves controlled by a mechanical instrumentality that is drivingly connected with a conveying means in a machine with which it is associated in such a way that it moves through its operating cycle at a rate of movement exactly proportional to the conveying means, and this regardless of any variation in rate of movement of the conveying means.

Another object is to provide novel electro-mechanical apparatus of the character noted utilizing a photoelectric cell and light beam for sensing work pieces travelling along a predetermined path.

A further object is to provide electro-mechanical control apparatus of the character noted in which novel means is provided for making adjustments for varying the time interval in which a work piece passes between a predetermined sensing point and a working station in which the operating tool moves to its operative position, for any given rate of movement of the work piece.

Still another object is to provide control apparatus for use in conjunction with a moving part in which electric instrumentalities above referred to include switches, in which certain of the switches are adjustable toward and from a movable actuating arm driven at a rate of movement proportional to the rate of movement of the moving part, whereby to vary the time interval in which the moving part moves between a predetermined sensing point and a working station, for effecting movement of an operating tool into and out of operative position.

Another object is to provide control apparatus of the character noted above which is equally adapted to controlling operations of a moving object such as a conveying means in each of mutually reverse directions individually or in compound relations.

Still another object is to provide control apparatus including a mechanical portion driven or controlled by a moving mechanical device such as a conveyor, which is not limited to control of electric instrumentalities but may be equally well adapted to other kinds of instrumentalities such as the mechanical, hydraulic and pneumatic.

Other objects and advantages of the invention will appear from the following detailed description taken in conjunction with the accompanying drawings in which:

FIG. 1 is a diagrammatic view of a machine with which the present invention may be incorporated;

FIG. 2 shows the control circuit of the control mechanism of the present invention;

FIG. 4 is a semi-diagrammatic view of the clutch means;

FIG. 5 is a detail view of the switch actuating arm and the retracting means therefor;

FIG. 6 is a diagrammatic view of an arrangement for moving the operatng tool of the machine into and out of operative position;

FIG. 7 is a diagrammatic view of the drive means from the prime mover to the conveying means and the clutch means;

FIG. 8 is a view of a workpiece which in the present instance is in the form of a sheet;

FIG. 9 is a detail view of the switch actuating arm of FIG. 5, taken from the side thereof;

FIG. 10 is a semi-diagrammatic view of an alternate form of means for actuating the controlling mechanism;

FIG. 11 is a semi-diagrammatic view of the apparatus of FIG. 10, taken from the left thereof, together with other related parts; and FIG. 12 is a detail view of a modified form of part of the construction of FIG. 11.

Figure 3:
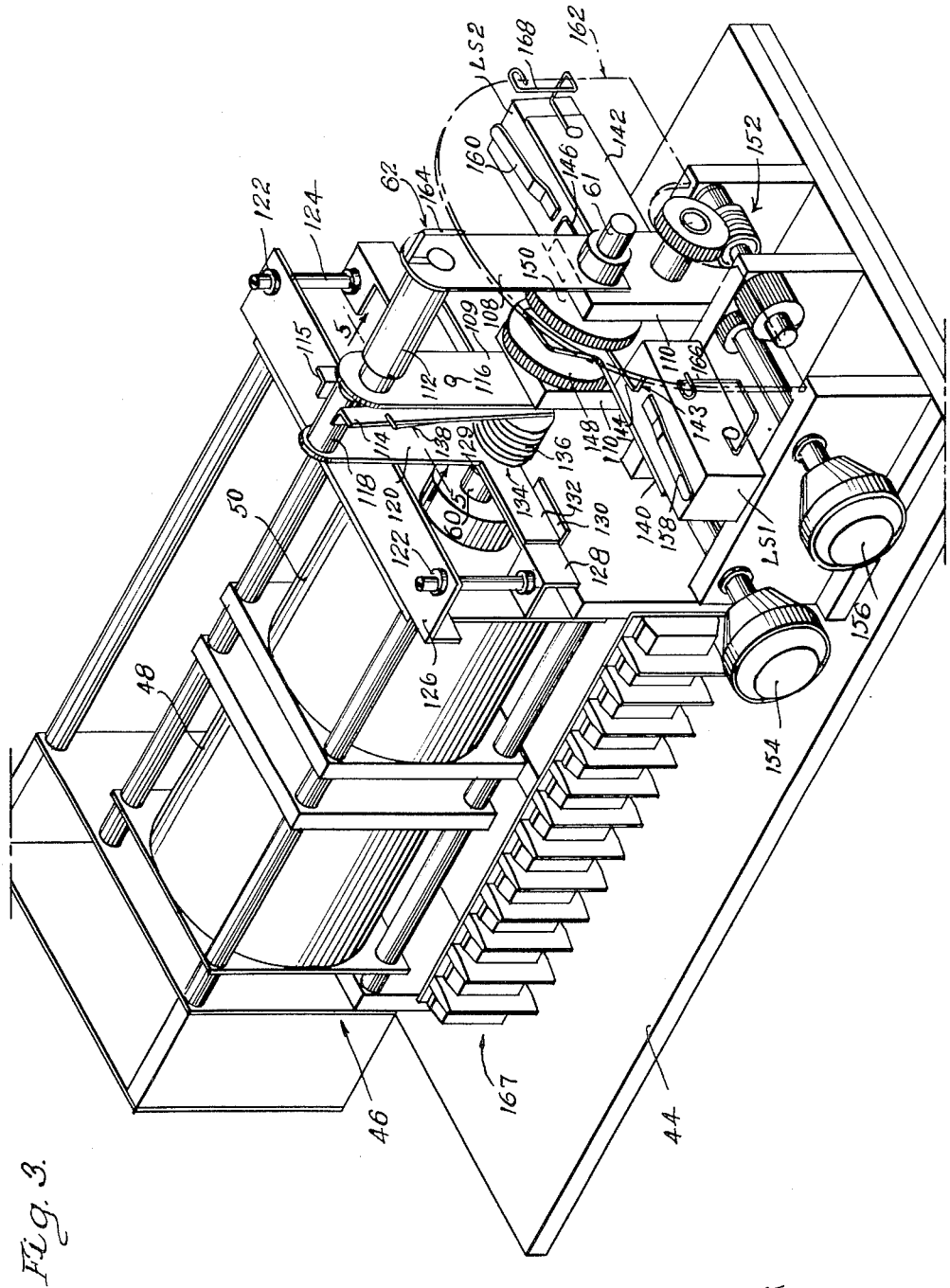
FIG. 3 is a perspective view of the mechanical clutch means and associated mechanical controlling mechanism.

Referring in detail to the drawings, attention is directed first to FIGURE 1 showing a machine tool 12 of known kind. The machine tool 12 constitutes a single example of many different kinds of applications of the present invention, it being understood that the present application of the invention is for the purpose of controlling the operation of the machine tool in accordance with workpieces conveyed along a path in association with the machine tool. The machine tool 12 as here represented includes a base portion 14 and an upper portion 16 rising from the top of the base portion where conveying means or a conveyor 18 is disposed. The conveyor 18 is of conventional construction of any desired kind and includes means for conveying workpieces 20 therealong, which in the present instance may take any desired form for moving them at a predetermined linear rate, such as rolls 22. These rolls 22 are arranged in a line each above and below the workpieces, and are rotated by a suitable drive means referred to hereinbelow, and when so rotated in the desired direction, as indicated, convey the workpieces 20 along the conveyor in a corresponding direction, which in the arrangement of FIGURE 1 is from right to left as indicated by the arrow 24. The rolls 22 are all interconnected for simultaneous drive by suitable means, and in FIGURE 1 a shaft 26 of one of the rolls is represented, this shaft occurring again in FIG. 7 which diagrammatically represents the interconnection between the conveyor and the clutch means together with the drive means therefor. The rate of linear movement of the workpieces is equal to the linear peripheral rate of movement of the rolls 22.

An operating tool is shown at 28 which in the present instance is represented as what is known as a "billy roll," but it will be understood that the operating tool 28 may be any of various kinds such as a polisher, grinder, etc. This operating tool 28 is mounted on a shaft 30, and arranged for vertical sliding movement in the upper machine portion 16, being guided by engagement by the shaft with the side edges of a vertical slot 32 in the machine tool. The tool 28 is movable downwardly into engagement with the workpieces 20 at what may be referred to as a work station 34, and the workpieces successively travel along the path defined by the conveyor 18. The operating tool 28 which is controlled by a mechanism represented in FIG. 6 and to be described presently, moves into the operative position for performing the desired work operation, and when that operation is completed, the operating tool is retracted from the operative position, or moved upwardly.

Referring to FIG. 6, the mechanism for moving the operating tool 28 into and out of operative position may include, for example, a compressed air cylinder 27 having a piston 29 connected with the shaft 30. The piston is biased upwardly by a spring 31 and is moved downwardly for moving the operating tool in operative position by a supply of compressed air passing through a conduit 33, controlled by a valve 35 actuated by a solenoid 39. Upon energization of the solenoid 39, the closer 37 is retracted, opening the valve to let the compressed air into the cylinder. Upon de-energization of the solenoid 39, the closer is moved to closed position. The specific relation and operation are as follows: it will be seen that closer 37 extends through apertures 37a and 37b in two walls of the valve, these being closed respectively by elements 37c and 37d. When the closer is retracted, aperture 37a is opened, allowing air to pass into the cylinder, and the aperture 37b is closed; when the closer moves to its opposite position (that shown), the aperture 37a is closed, and the aperture 38a is opened, permitting escape of air from the cylinder. Suitable supporting or guiding members 41 may be provided for the shaft 30, including or in addition to the edges of the slot 32.

The conveyor 18 as indicated above may be of conventional construction, but provided with at least an aperture 36 (FIG. 1) for passage of a light beam from a conventional light source 38 to impinge on a photoelectric cell 40 contained in the circuit arrangement of FIG. 2 and described in detail hereinbelow. The workpieces 20 in one exemplary application of the invention are imperforate objects, and when they pass the light beam between the light source 38 and the photoelectric cell 40, they cut off the beam and retain the beam interrupted throughout the passage of the respective sheet past the aperture with consequent control functions being performed in accordance with the character of the invention as described fully hereinbelow. The sheet 20 may be, for example, steel sheets and the operating tool 28 may be a grinder for finishing the surface of the sheets.

The instrumentalities for directly performing the control functions exercised on the machine tool 12 include electrical switches and relays, etc., but the means for converting the movement of the conveyor 18 into a linear component of mechanical movement, in one form of the invention, includes clutch means shown in FIGS. 3 and 4. Reference will now be had to those figures in connection with the following detailed description of the clutch means. FIG. 3 shows the clutch means and electrical switches and the elements utilized for actuating those switches in accordance with the mechanical movements of the clutch means. A base plate 44 supports a suitable framework 46 having a first clutch 48 and a second clutch 50. These clutches may be a single compound clutch arrangement or two individual and separated similar clutches, as desired, and for convenience the following discussion will be from the standpoint of two separate and individual clutches. These clutches are indicated semi-diagrammatically in FIG. 4 where their construction from the standpoint of their function is more clearly set out.

The clutch 48 includes a driven member 52 and a driving member 54 while the clutch 50 includes a driven member 56 and a driving member 58. The driven members 52 and 56 are secured to a common shaft 60 co-axial with a separate shaft 61 on which is mounted a switch actuating arm designated 62 shown in FIG. 3. The driving member 54 of the clutch 48 is mounted on a shaft 64 suitably mounted for rotation in a frame element 65 and having a gear 66 on its end opposite the driving member. The gear 66 meshes with an idler gear 68 and the latter meshes with a drive gear 70 fixed on a shaft 72. At the other end of the clutch arrangement, the driving member 58 is secured to a sleeve 74 rotatably supported in the frame element 76. A gear 78 is secured to the end of the sleeve 74 opposite the driving member 58, and meshes with a gear 80 secured to the shaft 72. The sleeve 74 rotatably receives the shaft 60. Solenoids 82 and 84 are shown associated with the shaft 60 for shifting the driven members 52 and 56 in their respective directions for engaging them with their associated driving members. Upon energization of either solenoid the desired shifting action takes place, namely, when the solenoid 82 is energized, the driven member 52 shifts into engagement with the driving member 54, and on the other hand, when the solenoid 84 is energized, the driven member 56 is moved into driving engagement with the driving member 58. To enable this shifting movement, the shaft 60 has free axially sliding movement. The solenoids 82 and 84 can be energized only singly. Compression spring means 86 and 88 may be utilized for biasing the driven members 52 and 56 to their neutral or non-engaged positions.

Upon energization of the solenoid 82 and engagement between the members 52 and 54, the driven member 52, and consequently the shaft 60 rotate in a first direction, which in the example assumed herein, is in the direction of the arrow 90 (FIG. 4), or counterclockwise as viewed from the right, and conversely when the other clutch means 50 is engaged, the rotation of the driven member 56 and shaft 60 is in the opposite direction as indicated by the arrow 92, or clockwise as viewed from the right. The clutch means is rotated by the shaft 72, as will be understood, this shaft having a bevel gear 94 in mesh with an associated bevel gear 96 secured to a shaft 98.

Reference may now be had again to FIG. 7 where the shaft 98 appears having a pulley 100 mounted thereon. A belt 102 is trained over the pulley 100 and a pulley 25 on the shaft 26 referred to above for driving the conveyor means, and a third pulley 104 on a prime mover which in the present instance may be an electric motor 106 mounted on or in the machine tool 12 in any suitable location thereon. As will be seen from the driving arrangement of FIG. 7, the rate of movement of the clutch means as exemplified by the rate of rotation of the shaft 98 and corresponding rotation of the shaft 60 is directly proportional to the rate of movement of the conveyor as represented by the linear movement of the work pieces thereon as determined by the rate of rotation of the shaft 26, and this direct proportion of rates of movement maintains regardless of the rate of movement of the conveyor.

Reference may be had again to FIG. 3 where the actuating arm 62 referred to above is seen to include two axially spaced arms 108 and 109. These arms are connected at one end to the shaft 61 for swinging movement thereon as explained below, the shaft being mounted in suitable frame elements 110. A bar or rod 112 is connected to the swinging ends of arms 108 and 109 and is arranged for alternative engagement with switches LS1 and LS2 respectively, depending on the direction of swinging of the arm 62, which in turn is dependent upon which of the clutches 48 and 50 is energized or engaged. The actuating arm 62 is driven by a driving arm 120, as explained below, in opposite advancing and retracting directions.

The arm 120 is secured to the shaft 60, as seen in FIG. 9, and thus is driven directly by that shaft. The arm 120 has lateral extensions 132 (FIG. 3) radiating from its pivot axis which engage lugs 130 on adjusting arm 128 also pivoted on the shaft 60. The arms extend in opposite directions and engage respective centering adjustment means 122 each of which includes a screw-threaded pin 124 adjustably secured in a transverse frame member 126 and engaged by the outer end of the respective arm 128. A coil spring 129 (FIG. 9) surrounds the shaft 60 with opposite ends 131 engaged under the respective extension 132 and arm 128. This spring biases the arm 120 to its neutral centered or vertical position, while the adjustment means 122 acting through the arms 128 provide for centering of the arm 120.

The driving connection between the arms 120 and 62 includes arms 114 and 115 (FIGS. 3 and 5) pivoted on the shaft 61 and straddling the pin 118 at their swinging ends. The arms are biased to their neutral upright positions in engagement with the pin 118 by a coil spring 136 surrounding the shaft 61 with terminal portions 138 biased toward each other engaging the outer edges of the arms. The arm 109 is provided with a pin 116 also engaged on opposite sides by the arms 114 and 115, which serves as the means for transmitting driving force from the arms 114 and 115 to the arm 109. The pin 116 is of appropriate diameter relative to the pin 118 as to be engaged simultaneously with the pin 118 by both arms 114 and 115, considering its relatively radially inner position relative to the axis of the shaft 60.

Upon rotation of the shaft 60 in one or the other direction, such, for example, as in the first direction in the example assumed, or counterclockwise as viewed from the right in FIG. 3, upon energization of the clutch 48, the driving arm 62 is driven in the direction mentioned by the direct connection of the arm with the shaft, as described above. The pin 118 swings the arm 114 in that direction, and because the arms 14 and 115 normally assume a unitary assembly, as they do, the arm 115 through engagement with the pin 116 swings the arm 62 in the same direction until the pin 112 engages the respective limiting switch, LS1. The arrangement provides a safety or overrunning feature, in that if the shaft 60 and arm 120 should not stop immediately upon engagement of the pin 112 with the switch, as explained below, spring 136 will yield and enable the arm 114 to overrun without damaging the switch. Upon cessation of movement of the arm 120, and associated de-energization of the clutch, as explained below, the spring 129 returns the arm 120 to neutral upright position, and this in turn returns the arm 62 to neutral upright position, acting through the arms 114 and 115. A similar result is accomplished in the opposite direction, namely, when the clutch 50 is energized and the actuating arm 62 is moved in clockwise direction. In this latter movement, the arm 62 engages the switch LS2, and upon release of that clutch, the arm is returned to neutral, or zero, upright position.

The switches LS1 and LS2 are mounted for swinging movement about the axis of the shaft 61, by means of arms 140 and 142 secured to the respective switches and swingably supported at one end on the shaft. These switches are biased to lower positions by means of a spring 143 having a central coiled portion surrounding the shaft 61 and end portions 144 and 146 respectively engaging the switches LS1 and LS2.

The switches LS1 and LS2 are arranged for adjusting movements upwardly by means of gears 148 and 150 mounted on the shaft 61 and secured to the arms 140 and 142 respectively. Leading from these gears, 148 and 150, are gear trains only one of which, 152, is shown, terminating in hand knobs 154 and 156, respectively. Upon rotation of these knobs in one direction, the switches are moved upwardly and in response to their rotation in the opposite directions, they are moved downwardly. They may be moved downwardly under the direct action of the gear trains or under the influence of the spring 143, or both, the spring 143 being utilized to eliminate the usual play between the connected parts. The switches LS1 and LS2 include actuating elements 158 and 160 which move these switches to alternate closed positions, the switches being two-position switches as shown in the circuit diagram of FIG. 2.

The structure of FIG. 3 includes an indicating dial 162 for use with a pointer 164 on the actuating arm 62 and other pointers 166 and 168 connected to the switches LS1 and LS2 respectively. The positions of the switches LS1 and LS2 are indicated by the pointers 166 and 168 which are the positions in which the switches will be actuated by the actuating arm 62.

Attention is now directed to the circuit diagram of FIG. 2. A binding post member 167 may be provided in a suitable location such as on the structure of FIG. 3 through which various of the electrical connections are put in circuit. A source of electrical supply, such for example as 115 v. A.C., is provided at 169 leading to a rectifier 170 among other elements including the light source 38 (FIG. 1) referred to above. The photoelectric cell 40 is in series with a relay A, the switch A1 of which is shown in a D.C. circuit with the solenoid 82 referred to above and appearing in FIGS. 3 and 4. The normally closed switch A1 is opened in response to energization of the A coil, the coil being energized when the light beam impinges on the photoelectric cell.

The sequence of operation of the mechanism is as follows. In the absence of any work pieces 20 on the conveyor a light beam is established to the photoelectric cell 40 and the switch A1 is open. When a work piece passes the desired predetermined sensing point on the conveyor, namely, the aperture 36, the beam is interrupted, the A coil is de-energized and the switch A1 is closed. This completes a circuit to the clutch solenoid 82 and the clutch 48 is engaged which results in rotation of the shaft 60 to swing the actuating arm 62 toward the switch LS1.

When the actuating arm 62 so engages the switch LS1, the switch is moved to its alternate position, opposite that shown in FIG. 2, and closes a circuit to the B relay. Upon energization of the B coil, the switch B2 is opened to de-energize the solenoid 82 and release the clutch 48; the actuating arm 62 is moved to its zero or neutral position by the retracting arm 114; switch B1 is closed, setting up a holding circuit for the B coil; switch B4 is closed, energizing the solenoid 39; and switch B3 is closed, conditioning the associated circuit portion for energization of the C coil upon closing of the switch A2.

Energization of the solenoid 39 retracts the valve closer 37 and admits compressed air into the cylinder as described above, resulting in projection of the piston 29 and lowering of operating tool 28 into its operative position. The apparatus is at equilibrium and until further control steps are accomplished, the conveyor 18 continues to move the work pieces 20 along the path of the conveyor, and the operating tool 28 continues its operation. When the work piece in question, namely, that one which cuts off the beam, and on which the operation is being performed, passes the aperture 36, the light beam is re-established to the photo-electric cell which energizes the A coil. This closes the switch A2 and closes a circuit to the C relay coil, the switch B3 being closed at this point as stated above. Upon energization of the C coil, the switch C1 is closed and completes a circuit through the normally closed switch D1 to the other clutch solenoid 84 in the D.C. circuit. As explained above, energization of the solenoid 84 results in the clutch 50 being engaged, and the shaft 60, and consequently the actuating arm 62, is rotated in the opposite direction, or clockwise as viewed in FIG. 3. Upon continued movement of the actuating arm 62, it engages the switch LS2 which in turn closes a circuit to the D coil. Energization of this coil results in opening the switch D1 and de-energizing the clutch solenoid 84 which permits the arms 120 and 62 to be moved upwardly to their neutral position, as explained above. At the same time, the switch D2 is opened, de-energizing the B coil and opening the switch B4. In response to the switch B4 being opened, the solenoid 39 is de-energized, and this action permits the billy roll to be moved out of operative position under the action of spring 31 as explained above.

Energization of the D coil in the step just described opens the normally closed switch D2 and breaks the circuit to the B coil which results in opening of the switch B3 and deenergization of the C coil. De-energization of the C coil results in opening of the switch C1 and the circuit is thus returned to its starting position. It will be understood that return of the actuating arm from its position engaging either of the switches LS1 or LS2, results in the respective switch returning to its normal position shown in FIG. 2.

It will be understood from the foregoing that the interval between the time when a work piece interrupts the beam and the time when it reaches the working station is a component of the linear rate of movement of the conveyor. This same rate of movement is converted to a directly proportional rate of linear movement in the clutch means 48 which, because of its direct connection with the conveyor, establishes an interval from the time that the actuating arm begins its movement in advancing direction until it engages the respective switch (LS1), regardless of what that rate of movement happens to be, and further regardless of whether the rate of movement may vary within such period. The same or a similar condition exists in connection with the interval between the time the trailing edge of the work piece passes the beam and permits its re-establishment and the time it reaches the working station and the clutch 50 is engaged for moving the actuating arm in the opposite direction or toward the switch LS2. It will be understood that the drive connection between the conveyor and clutch means may assume any of various forms such as direct shaft coupling, belt, chain, gear, or other connection.

As a practical example of an advantage of the present invention, it may be explained that certain work pieces such as the sheets 20 must be surfaced or treated in exact operations, i.e., the operating tool 28 should not move into its operative position too soon, because it may remove too much material from the leading edge of the sheet. Similarly, if it should move to its operative position too late, not enough material will be removed. Similar conditions exist with respect to the trailing edge of the sheet. The exactness required in this connection can be achieved by making adjustments of the switches LS1 and LS2, or both.

It will be understood that the apparatus of this invention is readily adaptable to reverse motions, such as may be desired in connection with a conveyor travelling in the opposite direction. This may be accomplished in a simple manner by reversing the connections of the switches LS1 and LS2 in a known reversing switching means. Also, compound reversing movements can be produced, the consideration being that the beginning and end of operations can be accurately controlled. Examples of such modified forms of movements and the control thereof are set out hereinbelow.

It will be understood that the apparatus of this invention may be adapted to other than electrical controls, including mechanical, hydraulic, pneumatic, etc. Furthermore, it will be appreciated that the sensing means need not be constructed only by a photoelectric cell but may assume other known forms, although a photoelectric cell means has been found to be highly effective.

Among the variant forms the invention may assume is a camming arrangement utilizing a "taper bar" such as illustrated in FIGS. 10, 11 and 12. The views of these figures are diagrammatic and include only such essentials as are necessary to disclose the principle of operation involved. The conveyor of FIG. 1 is here represented by a reciprocating table 180 which in itself is of conventional form and is utilized for supporting a work piece and moving it reversely through a series of movements past a working station. The table 180 may be moved by a motor 182 through a rack and pinion arrangement 184. The table 180 is provided with an electromagnetic chuck 186 of conventional kind upon which is supported the work piece 188.

Instead of the operating tool 28 of FIG. 1, a tool 190 which may be a milling tool is operably mounted on a slide 192 mounted for reciprocating movement in directions transverse to the directions of movement of the table 180. The slide 192 may be actuated by an air cylinder 194 and accompanying arrangement similar to that of FIG. 6. Mounted on the slide 192 is a block 196 on which the tool 190 is operably mounted, the latter being driven by suitable means such as a motor 198 operating through a belt 200 trained on pulleys on the motor and tool. The slide 192 is shown in retracted position in FIG. 11, and is advanced by the air cylinder 194, moving to the left in advancing direction during which it performs the working operation on the work piece 188.

The apparatus of FIGS. 10, 11 and 12 include the arm 120 of the previous embodiment which is mounted on the shaft 61. However, instead of the arm 120 being driven by a clutch such as 48 or 50, it is driven by a camming element or taper bar 202 on the table 180 through a follower 204. The taper bar 202 is of appropriate length and inclination to cause the desired movement in the follower 204 for any given and desired increment of linear movement of the table. In the present example assumed, the inclination is quite great although the proportions thereof are exaggerated in the drawings. The follower 204 includes a lever arm 206 having a roller 208 at its swinging end engageable with the inclined surface of taper bar 202. The lever arm 206 is secured at one end to a shaft 210 co-axial with a shaft 211 and adapted to be clutched thereto through a clutch 212 having a driving element 214 on the shaft 210 and a driven element 216 on the shaft 211. The shaft 211 is co-axial with the shaft 61, referred to above, and to which the arm 62 is secured.

The pin 118 cooperates with the arms 114 and 115 for moving the arm 62 in the same manner as described above. These clutch elements 214 and 216 are normally separated but are adapted to be clutched and operably connected together through the instrumentality of a fixed solenoid 218 which operates similarly to the fixed solenoids 82 and 84, namely, upon energization thereof it causes the driven element 216 to be brought into driving engagement with the driving element 214. The arm 120 and the follower 204 are biased in the direction opposite that in which they are moved by the taper bar by means of springs 220 and 222 respectively, similarly to the springs 129 and 136 referred to above, each having one end portion engaging a fixed element of the frame and the other end portion engaging the member to be biased. Specifically, in the present instance and as viewed in FIG. 10, the taper bar 202 is adapted to move the follower 204 and arm 120 in counterclockwise direction, pursuant to movement of the work piece table 180 to the left, and upon movement of the table in the opposite direction, the arm and follower are moved in clockwise direction by means of springs 220 and 222, retaining the follower roller 208 in constant engagement with the taper bar.

The limit switches LS1 and LS2 referred to above are shown in FIG. 10, being arranged for engagement of one or the other of them, or both, by the actuating arm which is moved by the arm 120, in the same manner as described above. A control circuit, indicated in FIG. 11 as containing only the principal elements thereof, includes the motor 182 for driving the work piece table 180, the solenoid 218 for energizing the clutch 212, a normally closed switch 224 which is included in the respective one of the limit switches LS1, LS2, and a limit switch 226 actuated by the operating tool slide 190.

Assuming a convenient starting point, in which the table 180 is positioned for the beginning of a cycle of movement during which a work piece thereon is to be operated by the tool 190, the arm 120 may assume a neutral or zero, upright position shown in FIG. 10. In this position of the arm 120, the follower 204 is in such a position relative to the taper bar 202 that it may be moved thereby fully in each of opposite directions to swing the arm 120 for consequently moving the actuating arm 62 into engagement with the one or other of the limit switches LS1, LS2. In other words, the follower roller 208 may be, for example, midway of the ends of the taper bar so that upon movement of the table in one direction, it rides on the taper bar sufficiently for swinging the arm 120 fully in one direction, and when moving in the opposite direction, swings the arm 120 fully to the opposite limit switch. In such condition of the parts, the operator manually turns on the starting switch which energizes the circuit of FIG. 11 and operates the motor 182 and energizes the solenoid 218. The table 180 is moved in the appropriate direction by the motor, e.g., to the left in FIG. 10, and the clutch 212 is engaged. Movement of the follower arm 206 serves to move the arm 120 through the engaged clutch 212, and this movement continues until the arm 62 controlled by the arm 120 engages the respective limit switch LS1. Upon this event happening, the switch 224 in the limit switch LS1 is opened and the solenoid 39 of FIG. 6 is energized for operating the air cylinder 194. Opening of the switch 224 stops movement of the driving motor 182 and the table 180 comes to a stop. The operating tool 190 then is put through its operating cycle advancing transversely across the work piece 188 and returning, pursuant to its cycle of operation determined by the nature of the machine tool. Upon its return to retracted position, the limit switch 226 is closed and then the cycle of operation described above for moving the table 180 is repeated.

Due to the de-energization or dis-engagement of the clutch 212 at each increment of movement of the table 180 and consequent return of the arm 120 to its zero position, the apparatus is adapted to intermittent repeated cycling in a single direction of movement of the table 180. That is, the table will move a predetermined distance, stop, again move the predetermined distance, again stop, etc., repeatedly. At each of these cycles, the clutch 212 is engaged and disengaged at the points noted above.

If desired, limit switches 228 and 230 may be provided for engagement by the ends of the table 180 at the limits of its range of movement for effecting reversal of the control apparatus and reversing the table 180, in a known manner. In the movement of the table 180 in the reverse direction, a similar series of steps are performed, energizing the motor 182, the clutch solenoid 218, etc., so that exactly the same operational steps are performed in repeated fashion except for direction of movement of the arm 120 and follower lever 204. Instead of the arm 120 swinging toward the limit switch LS1 (counterclockwise, FIG. 10), it swings toward the limit switch LS2 (clockwise) and effects operational steps through actuation of the switch LS2 as were performed in connection with the opposite switch LS1. In this series of steps, it will be understood that the follower lever 206 is moved from a limit depressed position at the left, in clockwise direction under the influence of a spring 222 pursuant to receding movement of the taper bar. The clockwise movement of the table 180 in a single direction. The the clutch 212 to the arm 120.

The present embodiment is adapted to intermittent movement of the table 180 in a single direction. The limit switches LS1 and LS2 may be adjustably moved toward and from the normal zero position of the arm 120 for adjusting the increments of movement of the table in the respective directions. They may be adjusted to the same position relative to the zero position, or different positions, depending on whether it is desired to have the same increments of movement in opposite directions or different increments of movement.

It may be desired to perform opposite and reversing functions pursuant to a simple reciprocation of the table 180. In such case, instead of two separate shafts 210 and 211 being provided, a single shaft 232 (FIG. 12) may be provided on which the follower 204 and arm 120 are mounted. In such case, the arm 120 moves in all cases simultaneously with the follower 204 and to the same extent thereof. In such case the arm 120 will swing toward the one limit switch LS1, and the opposite one LS2, at the respective ends of the range of movement of the table in opposite directions. In this case also the limit switches LS1 and LS2 may be adjustably moved toward or from the normal zero position of the arm 120 for varying the range of movement of the table, either in total range of movement, or with respect to either limit individually.

The embodiment of the invention illustrated in FIGS. 10, 11 and 12 show that the invention may be utilized for converting increments of linear movement of a conveying means, such as a conveyor or reciprocating table, into proportionate linear increments of movement in the controlling means for controlling that movement. Thus, in any case, the arm 120 moves through a certain predetermined range proportionate to the range of movement of the conveying means or table, during the same interval and consequently at the same rate, and this relation is not disrupted, even if the rate of movement of the conveying means should be changed during any given period.

It is thought that the invention and its attendant advantages will be understood from the foregoing description, and it will be apparent that various changes may be made in the form, construction and arrangement of the parts without departing from the spirit and scope of the invention or sacrificing all of its material advantages, the form hereinbefore described and illustrated in the drawing being merely a preferred embodiment thereof.

I claim:

1. Control apparatus comprising means for conveying a work piece along a predetermined path, means for driving the conveying means, an operating tool for performing a work operation on the work piece at a predetermined position in said path, control means for controlling said operating tool including at least one switch movable toward and from a zero position, an actuating arm normally in said zero position, and means operable in response to movement of the conveying means along said path for moving said actuating arm from its zero position toward and into operative engagement with said switch and at a linear rate proportionate to the rate of movement of the conveying means, said control means including means operative in response to actuation of said switch for operating the operating tool and for returning the actuating arm to its zero position.

2. The invention set out in claim 1 in which the means for actuating the actuating arm includes a camming surface on the conveying means and a follower on the control means.

3. The invention set out in claim 2 in which means is provided for stopping the conveying means so operative in response to actuation of said switch.

4. The invention set out in claim 3 including means operative in response to the operating tool completing a predetermined cycle of operation for causing movement of the conveying means by its driving means.

5. Control apparatus comprising means for conveying a work piece along a predetermined path, means for driving said conveying means, an operating tool for performing a work operation on a work piece at a predetermined position in said path, control means for controlling said operating tool including at least one switch movable toward and from a zero position, an actuating arm normally in said zero position, and means operable in response to movement of said conveying means along said path for moving said actuating arm from its said zero position toward and into operative engagement with said switch and at a linear rate proportional to the rate of movement of the conveying means notwithstanding any variation in the latter rate, said control means including means operative in response to actuation of said switch for operating said operating tool and for returning said actuating arm to its zero position.

6. Control apparatus comprising means for conveying a work piece along a predetermined path, means for driving said conveying means, an operating tool at a fixed work station in said path for performing a work operation on a work piece in response to the work piece reaching a predetermined position in said path, control means for controlling said operating tool including at least one switch adjustably movable toward and from a zero position, an actuating arm biased to and normally in said zero position, and means operable in response to movement of said conveying means along said path for moving said actuating arm from its said zero position toward and into operative engagement with said switch and at a linear rate proportional to the rate of movement of the conveying means nothwithstanding any variation in the latter rate, said control means including means operative in response to actuation of said switch for operating said operating tool and for returning said actuating arm to its zero position.

7. Control apparatus comprising a conveyor having a portion movable along a predetermined path for conveying a work piece along that path, means for driving said conveying means, an operating tool at a fixed work station in said path for performing a work operation on a work piece in response to the work piece reaching a predetermined position in said path, control means for controlling said operating tool including at least one switch adjustably movable toward and from a zero position, an actuating arm biased to and normally in said zero position, and means operable in response to movement of said movable portion of said conveyor along said path for moving said actuating arm from its said zero position toward and into operative engagement with said switch and at a linear rate proportional to the rate of movement of said movable portion of said conveyor nothwithstanding any variation in the latter rate, said control means including means operative in response to actuation of said switch for operating said operating tool and for returning said actuating arm to its zero position.

8. Control apparatus comprising a conveyor having a portion movable along a predetermined path for conveying a work piece along that path, means for driving said conveyor, an operating tool at a fixed work station relative to the linear movement of said movable portion for performing a work operation on a work piece pursuant to the work piece reaching a predetermined position in said path, means for periodically stopping said movable portion and operating said operating tool at each stoppage of said movable portion, and means for actuating said driving means.

9. The invention set out in claim 8 in which control means is provided controlled by movement of said operating tool upon completion of a predetermined operation for activating said driving means after each stoppage.

10. The invention set out in claim 9 in which reversing means is provided actuated by said movable portion of the conveyor for reversing the drive of the conveyor at the end of a predetermined range of movement in each of opposite directions.

11. The invention set out in claim 10 in which said reversing means includes means manually adjustable for adjusting said range of movement.

12. The invention set out in claim 8 in which control means is provided for stopping said movable portion of the conveyor and is controlled by movement of the said movable portion in the movements thereof, said control means including a member movable to a limit position wherein a switch is provided and the movable member actuates said switch for stopping the drive of the conveyor and then returns to a zero position, and upon recurrence of the movement of said movable portion of the conveyor it again moves toward said limit position.

13. The invention set out in claim 12 in which electrically controlled clutch means is interposed between said member and said conveyor.

References Cited by the Examiner

UNITED STATES PATENTS

| | | | |
|---|---|---|---|
| 2,292,892 | 8/1942 | Marsilius | 90—15.1 |
| 2,374,846 | 5/1945 | Thresh. | |
| 2,483,138 | 9/1949 | Helmer | 112—219 |
| 2,633,678 | 4/1953 | Smith. | |

WILLIAM W. DYER, Jr., *Primary Examiner.*